United States Patent Office 3,076,624
Patented Feb. 5, 1963

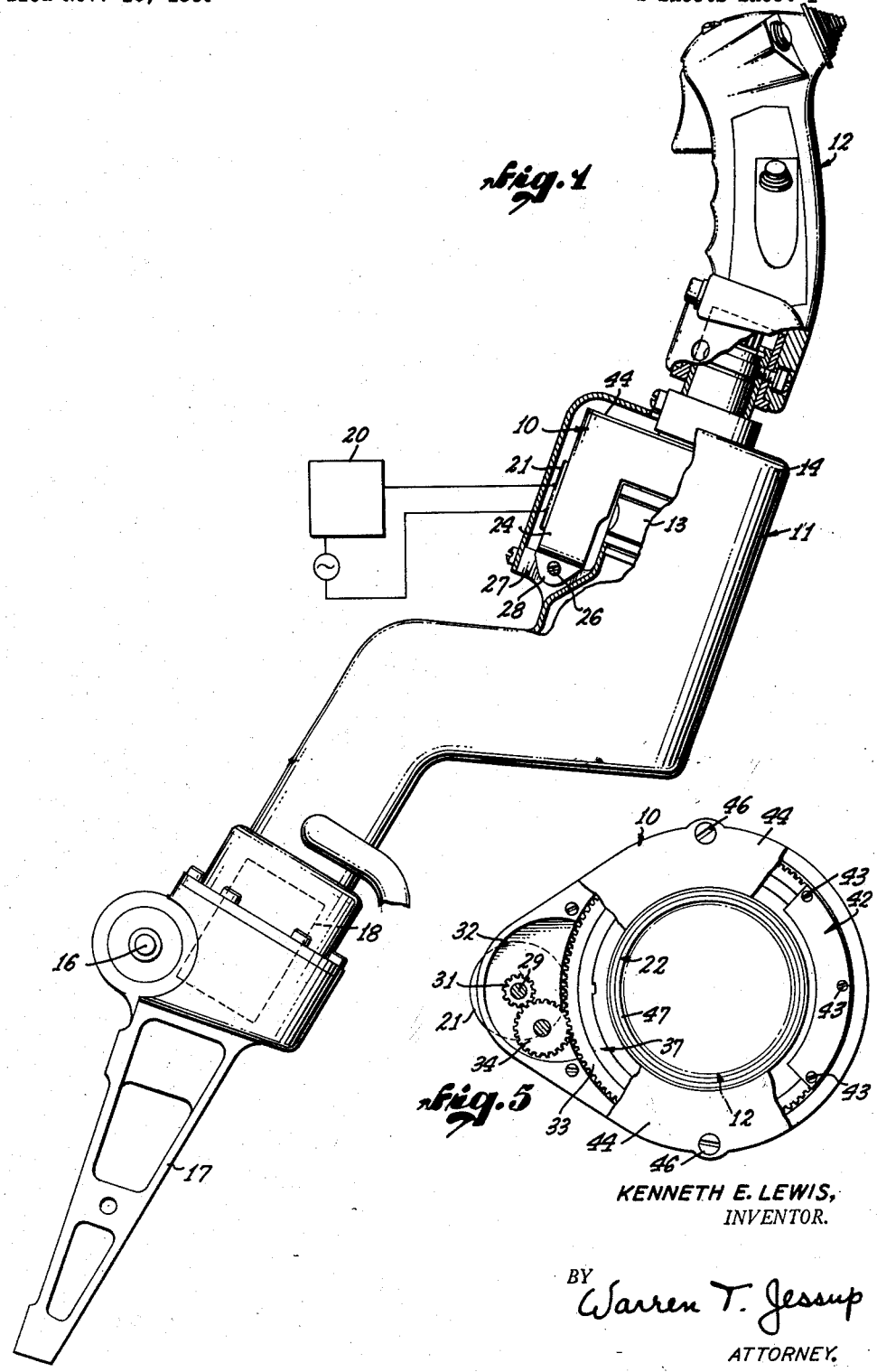

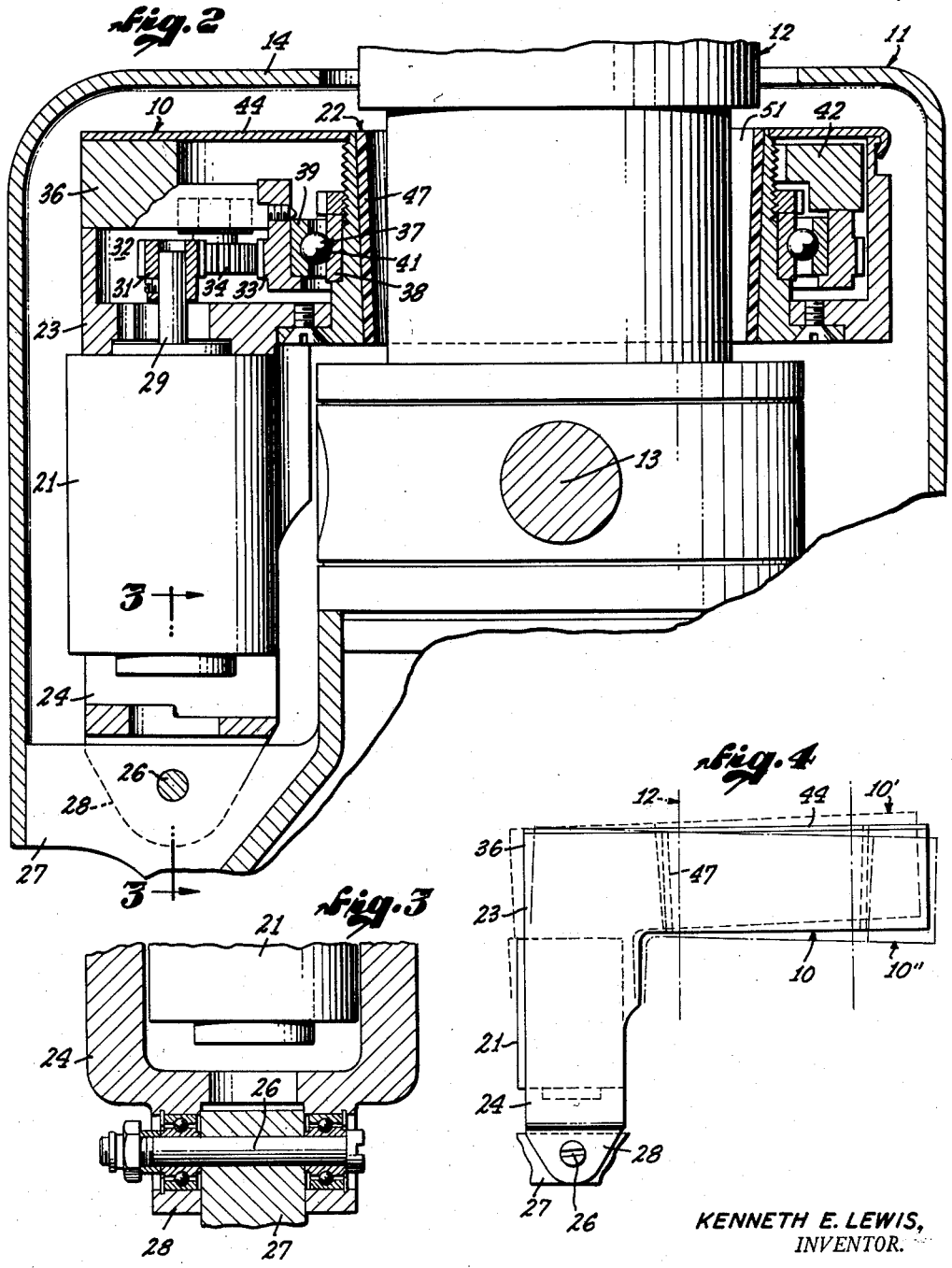

3,076,624
OSCILLATORY ALARM FOR AIRCRAFT
AND THE LIKE
Kenneth E. Lewis, Pacific Palisades, Calif., assignor to U.S. Science Corporation, Los Angeles, Calif., a corporation of Delaware
Filed Nov. 16, 1960, Ser. No. 69,618
4 Claims. (Cl. 244—83)

This invention relates to an oscillatory alarm for aircraft, and the like, and more particularly to a device responsive to the imminence of danger of the aircraft for warning the pilot when the attitude of the aircraft coupled with the speed and other factors is such as to place him in danger, by producing a violent oscillatory impact against the control stick of the joy stick.

Whereas the warning device of this invention is particularly adaptable for use with aircraft having a comparatively-light control stick pivotally mounted in a relatively heavier joy stick and coupled thereto by power means in the form of servomotors to give the pilot a mechanical advantage to pivot the heavier joy stick, it is to be understood that the invention may be applied to other control means.

In modern aircraft of heavier design, boosting or powered means are provided to afford mechanical advantage to the pilot for moving the comparatively heavy joy stick by a relatively lesser degree of manual force. A servomechanism is provided connecting a control stick to the comparatively heavy joy stick whereby movement of the control stick in one direction is transmitted by servomotors to move the joy stick in the same direction and to the same degree to control the attack angle of the aircraft.

This invention provides means responsive to, for example, an instrument capable of reading the angle of attack of an aircraft for causing a violent knock against the lighter of the sticks, the control stick controlled by the pilot, for warning the pilot of the dangerous condition. This invention makes no attempt to shake the heavier joy stick housing but instead shakes the lighter stick to produce a more effective reading in the pilot's hands. The control stick is shaked by the violent knocking of a semi-pliant and resilient ring or sleeve. The knocking force of the sleeve is produced in increased intensity by a rotatable ring having an eccentric weight wherein the vibratory force produced by the eccentric weight is restrained in all directions except one so that the momentum is built up and released for increased effect in the one direction.

It is therefore an object of this invention to provide a new and improved oscillatory alarm for an aircraft and the like which imparts a violent alarm to the lighter of the components of a powered aircraft joy stick.

Another object of this invention is to provide a new and improved warning alarm of the character described which imparts an increased signal to the pilot's hands by impact with the lighter component of the joy stick which is in immediate contact with the pilot's hand.

A further object of this invention is to provide a new and improved alarm device of the character described which provides pliant and resilient means at points of impact so as to minimize damage to the stick components due to the impact thereagainst.

Yet another object of this invention is to provide a new and improved device in which the impact force may be readily and easily varied.

A still further object of this invention is to provide a new and improved device of the character described which is economical to manufacture and capable of mass production.

A general object of this invention is to provide a new and improved oscillatory alarm for an aircraft and the like which overcomes disadvantages of prior means and methods heretofore intended to accomplish generally similar purposes.

These and other objects of this invention will be more apparent from the following detailed description, drawings and appended claims.

In the drawings:

FIGURE 1 is a side view, in elevation, of a conventional powered joy stick having in conjunction therewith, the alarm device of this invention, with parts broken away for greater clarity.

FIGURE 2 is an enlarged, vertical cross-sectional view, as taken substantially through the center line of the device of this invention, with parts shown in elevation;

FIGURE 3 is a fragmentary, vertical, cross-sectional view as taken substantially along the line 3—3 of FIGURE 2;

FIGURE 4 is a side view, in elevation, of the device of this invention, illustrating schematically oscillatory movement thereof; and FIGURE 5 is a top plan view thereof, with parts broken away for greater clarity.

Referring in detail to the drawings, there is shown by way of illustration, but not of limitation, an oscillatory alarm device designed and constructed in accordance with this invention and generally designated by the numeral 10. The device 10 is illustrated, for example, as associated with a joy stick 11 having a control stick 12 pivotally secured thereto as at 13 for universal pivotal relative movement. The joy stick 11 is illustrated as being of a conventional heavy-duty type and having a housing 14 pivotally mounted as at 16 to an aircraft (not shown) and having an extension 17 securable to control elements (not shown) for actuation of the control elements.

The basic design of the assembly 11—12 is such that the joy stick 11 is controlled by the control stick 12 which is gripped by the pilot's hand. When the control stick 12 is moved forward, a switch which is incorporated with the universal mounting 13 sets in motion a conventional servo system indicated by the dotted lines 18 that causes the entire housing 14 to follow. The same is true for sideward motion or a combination of side and forward and rearward motion by virtue of closing of corresponding switches. The assembly is a conventional servo system that causes the relatively heavy housing 14 to follow the action of the control stick 12 in accordance with the pilot's control. It is a feature of this invention that the oscillatory device makes no attempt to shake the relatively heavy housing 14 but instead applies an oscillatory impact or knocking force, in a manner to be hereinafter described, against the relatively lighter control stick 12 controlled by the pilot wherein the much lighter unit can produce a more effective reading in the pilot's hand.

For example, one of the uses of the oscillatory device 10 is to warn the pilot when the attitude of the plane, coupled with the speed and other factors, is such as to place him in danger. An angle of attack reading as produced, for example, on an instrument schematically shown in FIGURE 1 and designated by the numeral 20 energizes a motor 21 of the device 10 to oscillate the device, in a manner to be hereinafter described, to cause an annulus 22 thereof to knock violently against the control stick 12, warning the pilot that he is in trouble.

The device 10 includes a housing 23 having the annulus 22 circumjacent to the control stick 12 and a depending portion 24 pivotally secured as at 26 to a web 27 of the housing 14. For this purpose, the depending portion 24 is bifurcated at its lower end to form a clevis 28 spanning the web 27 in close fitting relationship thereto. The motor 21 is secured in the depending end 24 of the housing 10 and includes a driven shaft 29 having a pinion gear 31 removably secured thereto, the pinion gear 31 extending into a cavity 32 of the housing. The rotation of the shaft 29 is translated into a rotation of a ring gear 33, circumjacent to the annulus 22, by an idler gear 34 removably secured in an upper portion 36 of the housing 10.

The ring gear 33 is rotatable relative to the annulus 22 as on a low friction bearing 37 having an inner race 38 fixedly secured to the annulus 22, an outer race 39 secured to the ring gear 33 and a plurality of rolling elements 41 between the races 38 and 39. The ring gear, as best seen in FIGURES 2 and 5, is provided with a weight 42 eccentrically secured thereto as by fasteners such as screws 43. The cavity 32 is preferably enclosed as by a removable cover plate 44 secured to the housing as by a plurality of fasteners indicated at 46.

When the motor 21 is energized in response to reading of the instrument 20, the driven shaft 29, through the pinion and idler gears 31, 34, respectively, rotates the ring gear 33. The weight 42, rotating with the ring gear 33, imparts a shaking moment to the housing 10, and thereby the annulus 22, in three different axes. Two of these, however, are absorbed by the pivotal mounting at 26 so that only the third moment, which is fore and aft relative to the stick assembly 11—12 and about the axis of the pivot 26, is allowed to oscillate the housing 10. By restraining the moment of two of the axes, the net effect is to store up momentum in the weight 42 so that finally, when the eccentric weight 42 does come around to produce an impact in the third axis in which it is free to move, there is stored up momentum which gives a solid impact against the control stick 12. The pivotal securement at 26 is preferably a good tight fitting pivot to prevent any movement in other than the specified third moment to prevent absorption of some of the energy which is preferably stored for a good solid knock on the knocking axes.

The annulus 22 is preferably lined with a sleeve 47 of a semi-pliant, resilient material such as nylon, or the like, which is not as hard as steel, yet hard enough to transmit the blow to the stick. This minimizes damage due to repeated impact against the control stick 12 during oscillation. The sleeve 47 is fixed in any suitable manner to the annulus 22 and does not rotate. Only the ring gear 33, driven by the gear 34 and pinion 31, rotates to create the unbalance due to the arcuate weight 42, thus shaking the housing 10 back and forth by virtue of pivotal mounting at 26.

In order that a relatively solid knock be produced between the sleeve 47 and the control stick 12, the sleeve 47 is preferably conical in configuration, as best seen in FIGURE 2, whereas at its contact positions indicated by the dotted and broken line positions 10' and 10" in FIGURE 4, a relatively flat surface is impacted against the outer surface of the control stick 12.

If desired, the idler gear 34 and pinion gear 31 may be removed and replaced respectively with gears having different diametrical dimensions so as to change the speed of rotation of the ring gear 33 and thereby change the speed and force of the oscillation of the housing 10. The idler gear 34 is offset from a direct line between the pinion 31 and the ring gear 33. For example, by replacing the pinion gear 31 with a larger one and the idler gear 34 with a smaller one, it is possible to speed up the rotation of the ring gear 33 to increase the oscillatory force directed to the annulus 22. The housing 10 and all of its integral parts is preferably made heavy in order to give a high momentum and impact when the sleeve 47 strikes against the control stick 12. The clearance, as indicated at 51, between the control stick 12 and the sleeve 47, is preferably liberal to allow freedom of movement of the control stick 12 therein and to provide a substantial movement of the oscillation of the housing 10 for a substantially violent knocking effect against the control stick 12.

While the instant invention has been shown and described hereinto what is conceived to be the most practical and preferred embodiment, it is recognized that departures may be made therefrom within the scope of the invention which is therefore not to be limited to the details disclosed herein but is to be afforded the full scope of the claims.

What is claimed as new and desired to secure by Letters Patent is:

1. An aircraft alarm adapted to be secured to an aircraft joy stick and comprising a body having a sleeve circumjacent at least an elongate portion of said joy stick, and a bifurcated support portion extending generally transversely of said sleeve, means for pivotally mounting the extended end of said bifurcated portion to a portion of said joy stick for pivoting about an axis generally transverse of the axis of said elongate portion, a motor having a shaft and disposed between the arms of said bifurcated portion and mounted to said body at the end of said motor remote from said extended end of said bifurcated portion, the remaining portions of said motor being free of connection with said bifurcated portion, an eccentric member rotatably mounted to said body, and means for transmitting rotation of said motor shaft to said eccentric member for oscillating said body about its pivotal mounting to said joy stick housing, thereby to cause said sleeve to strike said elongate portion.

2. In an aircraft having an electric circuit, means responsive to the imminence of danger of the aircraft for energizing the circuit, a joy stick and a manually operable control stick pivotally mounted relative to said joy stick and having servo means in the housing of the joy stick and connected thereto and to said control stick for translating movement of said control stick into a movement of said joy stick in response to movement of said control stick, a control stick shaker comprising: a second housing pivotally secured to said joy stick housing for pivotal movement transversely to the axis of said control stick; an annular sleeve in fixed relationship to said second housing and circumjacent to said control stick; said sleeve being formed of a pliant, resilient material and having conical walls to provide linear contact with the exterior of said control stick when striking thereagainst; an antifriction bearing in said second housing and circumjacent to said sleeve, said bearing having an inner race, an outer race and rolling elements between said races, the inner race being fixed to said second housing; a motor mounted in fixed relationship to said second housing; means connecting the output shaft of said motor and said outer race for rotating said outer race; and a mass mounted to rotate with said outer race and being eccentrically disposed relative to said outer race, said motor being connected in said electric circuit so as to be energized in response to energizing of said circuit, the rotation of said outer race being translated into a shaking movement of said housing and said sleeve transversely relative to the axis of said control stick for striking said sleeve against the said control stick.

3. In an aircraft having an electric circuit, means responsive to the imminence of danger of the aircraft for energizing said circuit, a joy stick and a manully operable control stick pivotally mounted relative to said joy stick and having servo means in the housing of the joy stick and connected to said joy stick and said control stick for translating movement of said control stick into a movement of said joy stick in response to movement of said control stick, a control stick shaker comprising: a second housing pivotally secured to said joy stick housing for pivotal movement in a single plane transverse to the axis of the control stick and having an annulus circumjacent to said control stick for pivotal movement with said housing; a sleeve of pliant, resilient material lining said annulus for impact with said control stick, said sleeve having conical walls to provide linear contact with the exterior of said control stick when striking thereagainst; a motor fixedly mounted relative to said second housing and actuatable in response to energizing of said circuit; eccentric mass means rotatably mounted in said second housing; gear means connecting said eccentric mass means and the drive shaft of said motor for rotating said eccentric mass means so as to oscillate said housing and said annulus, said annulus being pivoted in said single plane against said control stick during oscillation of said housing.

4. In an aircraft having a joy stick having a housing and a manually operable control stick pivotally mounted on said joy stick housing, the joy stick being movable in response to movement of said control stick, a control stick shaker comprising: a sleeve movably mounted on said housing of said joy stick and circumjacent to said control stick for pivotal movement about a single axis with respect to said housing and being annularly spaced from said control stick; and means for oscillating said sleeve about said axis for diametric oscillation with respect to said control stick for diametric impact of said sleeve with said control stick, said sleeve having conical walls lined with pliant and resilient material, so that there is linear contact between said sleeve and the exterior of said control stick when the two strike together.

References Cited in the file of this patent

UNITED STATES PATENTS

| | | |
|---|---|---|
| 2,393,892 | De Ganahl | Jan. 29, 1946 |
| 2,934,292 | Visser | Apr. 26, 1960 |
| 2,964,744 | Greene | Dec. 13, 1960 |